United States Patent [19]

Poudéroux et al.

[11] 4,315,528
[45] Feb. 16, 1982

[54] SUPPORT OF FIXING DEVICE FOR PIPES

[75] Inventors: Pierre Poudéroux, Meudon La Foret; Jean-Jacques Marsault, Meudon; Pierre Devoucoux, Suresnes; Roger Gérard, Hargeville, all of France

[73] Assignee: Societe Anonyme dite: Stein Industrie, Velizy-Villacoublay, France

[21] Appl. No.: 99,231

[22] Filed: Nov. 30, 1979

[30] Foreign Application Priority Data

Nov. 30, 1978 [FR] France ................ 78 33887

[51] Int. Cl.³ .................. F16L 3/00; E21F 17/02
[52] U.S. Cl. .................. 138/106; 138/107; 248/62
[58] Field of Search .......... 138/106, 107; 248/62, 248/68 R, 68 CB

[56] References Cited

U.S. PATENT DOCUMENTS 4,156,514 5/1979 Jones ................ 248/62

Primary Examiner—Steven L. Stephan
Attorney, Agent, or Firm—Sughrue, Mion, Zinn, Macpeak and Seas

[57] ABSTRACT

A support or fixing device for pipes whose walls are thin in proportion to their diameter and which are subjected to great temperature variations and/or which must be protected against earthquakes. It includes a collar 3 which surrounds the pipe and is spaced apart therefrom and is pierced with holes 12 at least at two points symmetrically disposed, fittings 11 welded to the pipe at the center of said holes, connection parts 15 engaged in each of the fittings and flexible strips 17 welded on one side to the connection parts and on the other side to parts 18 integral with the collar. Application to pipes which convey fluids which have high specific heat or to pipes which are installed at a site which is exposed to earthquakes.

4 Claims, 3 Drawing Figures

U.S. Patent     Feb. 16, 1982     4,315,528
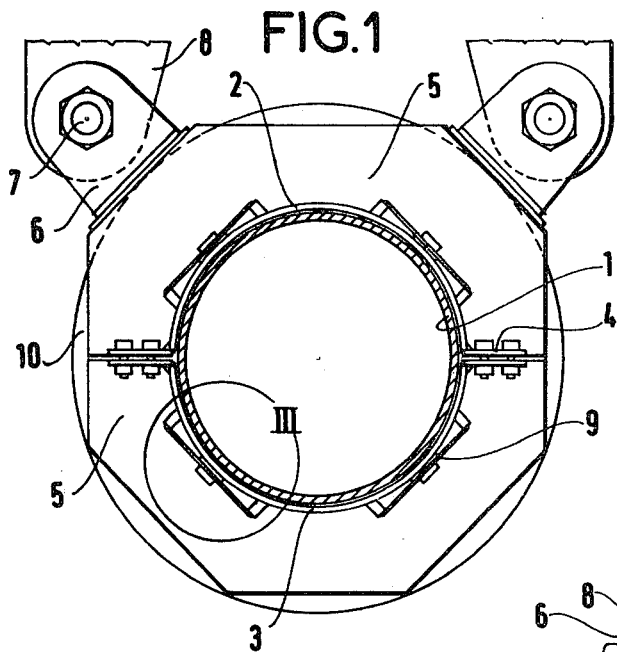
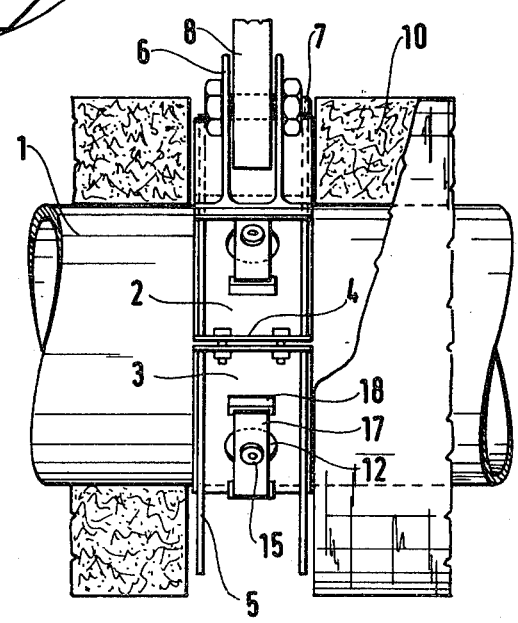
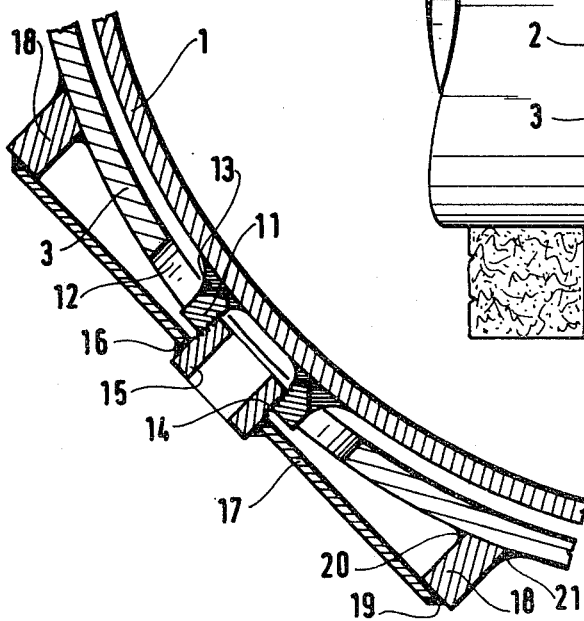

SUPPORT OF FIXING DEVICE FOR PIPES

The present invention relates to a support or fixing device for pipes whose walls are thin in proportion to their diameter and which are subjected to large temperature variations and/or which must be protected against earthquakes.

BACKGROUND OF THE INVENTION

Known supporting devices consist of collars in two parts, the diameter of such collars being slightly larger than the outside diameter of the pipe, and of asbestos rings disposed between the collars and the pipes and clamped against the pipes by the collars. However, such supporting devices are not suitable when the pipes are thin-walled in proportion to their diameter and are subjected to large temperature variations since the temperature of the fluid which flows therein can vary appreciably. Indeed, thin-walled pipes tend to sag between their supports and thermal expansion and contraction can cause the pipes to separate from their collars. If it is required to prevent deformation of the pipes, many support devices must be provided; this is expensive and inconvenient during maintenance of the pipes. Further, the pipes are not protected against earthquakes.

The present invention aims to provide a device for supporting pipes which holds the pipes while allowing enough play to avoid deformations subsequent to thermal expansion and contraction and protects them to a great extent from the effects of earthquakes while having a relatively simple structure which is easy to assemble or to dismantle.

SUMMARY OF THE INVENTION

The support device according to the invention includes:

a collar which surrounds the pipe and is spaced apart therfrom and is pierced with holes at least at two points symmetrically disposed on its periphery;

fittings welded to the pipe at the centre of said holes in the collar;

connection parts engaged in each of the fittings; and flexible strips welded on one side to the connection parts and on the other side to parts integral with the collar.

It further includes preferably at least one of the following features.

The fittings are cylindrical parts welded at one of their ends to the pipe and having bores in which the connection parts, which are also cylindrical, are inserted.

The bores of the fittings are tapped and the connection parts are threaded so that they can be screwed into the bores.

The flexible strip is rectangular and its center has a circular hole along the edge of which the strip is welded to the connection part.

BRIEF DESCRIPTION OF THE DRAWINGS

A device in accordance with the invention for supporting pipes which convey molten in an electric power station is described hereinafter by way of example and with reference to the accompanying drawings, in which:

FIG. 1 illustrates a diametral cross-secton of the device;

FIG. 2 is an elevation of the same device with a heat insulation of the pipe partially cut away; and FIG. 3 illustrates on a larger scale a detail III of FIG. 1, showing more clearly the structure of the support device.

DESCRIPTION OF THE PREFERRED EMBODIMENT

In FIG. 1, the large-diameter thin-walled pipe 1 has a diameter of 700 and 1000 mm, and a wall thickness of 10 to 20 mm for example. It is supported by a collar in two parts—namely an upper part 2 and a lower part 3—connected together by side tabs 4 joined together by screws and nuts. The inside diameter of the collar is adjustable by inserting suitable wedges between the tabs 4 so as to maintain a radial clearance of 3 to 5 mm between the periphery of the pipe and the collar, whose sides are fitted with stiffening flanges 5. The collar is suspended from tabs 6 fixed by bolts 7 to suspension arms 8 which may be equipped with shock absorbers. The pipe is connected to the collar by four fixing parts 9 regularly spaced around its periphery. The structure of such a fixing part will be described in detail with reference to FIG. 3. As in conventional configurations, the pipe is surrounded by thermal insulation 10.

As shown in FIG. 3, rings 11 are welded by weld beads 13 to the pipe at the centres of corresponding holes 12 in the collar. Each ring has a central tapped bore 14 into which an externally threaded cylindrical connection part 15 is screwed. The part 15 is welded at 16 to the edge of a central hole in a flexible rectangular strip 17 which is itself fixed by its ends to bars 18 by weld beads 19. The bars are fixed on the collar 3 by weld beads 20,21.

It is seen that if the pipe happens to expand or contract radially due to the change in temperature of a fluid flowing therethrough, it does not transmit any stress directly to the collar, expansion or contraction being absorbed by the flexibility of the strip 17. Further, stresses due to variations in loading on the pipe result in tangential shearing which favourable distributes stress in the pipe and limits the extent to whih it deforms out of round. Lastly, the rings which are the only parts welded to the pipe, are of small volume so they have low thermal inertia; this dispenses with the necessity of maintaining temperature gradients for an appreciable time on the pipe and prevents concomitant deformation.

Preferably, the collar is assembled on the pipe as follows. Firstly, the rings 11 are welded on the pipe. The bars 18 are welded on the half-collars 2 and 3 which are then installed on the pipe and to which the stiffening flanges 5 are fixed. The two half-collars are joined together on the pipe and the collar is positioned by adjusting its clearance with wedges placed between the tabs 4. The connection parts 15 are screwed into the rings. Then, the tube is made integral with the collar by installing the flexible strips 17, which are fitted onto the connection parts. The flexible strips are then welded firstly to the connection parts, then to the bars. Then the supports 6 are installed. Such an assembly can be formed either in a factory or on site.

Although the pipe support device which has just been described with reference to the figures appears to be the preferable embodiment, it will be understood that various modifications can be made thereto without going beyond the scope of the invention, it being possible to replace some of its components by others which can be perform an analogous technical function. In particular, the umber of fixing assemblies including a flexible strip for connecting the pipe to the collar can be other than four so long as there are two of them.

The support device in accordance with the invention is more particularly suitable for pipes whose temperature can vary greatly because they convey molten metal, but it applies generally to all large-diameter thin-walled pipes through which a fluid of high specific heat flows, as well as to pipes to be installed at a site exposed to earthquakes.

We claim:

1. A pipe support for pipes whose walls are thin in proportion to their diameter and which are subjected to large temperature variations and/or which must be protected against earthquakes, said device comprising;

a circular collar which surrounds the pipe and is spaced apart therefrom and which is pierced with holes along at least two points spaced symmetrically about the periphery of said collar;

fittings welded to the pipe at circumferential positions on the pipe which are centered with respect to said respective holes in said collar;

connection parts engaged in respective fittings;

at least one of said fittings and said engaged connection parts at each of said holes extending radially through said holes and outwardly of said pipe;

projecting parts integral with said collar at circumferentially spaced positions at opposite sides of each hole and projecting outwardly thereof; and wherein said device further includes flexible strips being welded intermediate of their ends to said connection parts, extending parallel to said collar, and being welded on their ends to the radially outboard ends of said parts integral with said collar to opposite sides of said holes and remote therefrom;

whereby, said flexible strips function to provide sufficient play to avoid deformation to the pipe subsequent to thermal expansion and contraction and protect said pipe to an appreciable extent from the effects of earthquakes.

2. A device according to claim 1, wherein the fittings are cylindrical parts welded at one of their ends to the pipe and having bores in which the connection parts, which are also cylindrical, are inserted.

3. A device accoring to claim 2, wherein the bores of the fittings are tapped and the connection parts are threaded so thay they can be screwed into the bores.

4. A device according to claim 1 or 3, wherein the flexible strip is rectangular and its centre has a circular hole along the edge of which the strip is welded to the connection part.

\* \* \* \* \*